No. 637,610. Patented Nov. 21, 1899.
E. F. HOLMES.
SHAFT COUPLING FOR BUGGIES.
(Application filed Apr. 24, 1899.)

(No Model.)

Witnesses
John Enders Jr.
F. B. Keefer

Inventor
Emory F. Holmes
By James L. Norris
Attorney

UNITED STATES PATENT OFFICE.

EMORY F. HOLMES, OF COLUMBUS, GEORGIA.

SHAFT-COUPLING FOR BUGGIES.

SPECIFICATION forming part of Letters Patent No. 637,610, dated November 21, 1899.

Application filed April 24, 1899. Serial No. 714,298. (No model.)

*To all whom it may concern:*

Be it known that I, EMORY F. HOLMES, a citizen of the United States, residing at Columbus, in the county of Muscogee and State of Georgia, have invented new and useful Improvements in Shaft-Couplings for Buggies and other Vehicles, of which the following is a specification.

My invention relates to shaft-couplings for buggies and other vehicles, the object of the same being to provide a device of this kind which is simple and cheap in construction and effective in operation and one in which rattling of the parts is effectually prevented. Other objects and advantages of the device will hereinafter appear.

The invention consists of a base-plate on the under side of the axle, a clip independent of said plate for securing the latter to the axle, an upwardly-extending hook on the forward end of the base-plate, a shaft-iron having a slot in its rear end which encircles said hook and forms a cross-bar which engages said hook, a locking-plate for retaining said cross-bar and hook in coupling relation having a grooved forward end which engages said cross-bar and a longitudinally-extending recess on its under side which intersects said grooved forward end, and a block of rubber or other analogous material secured in said recess projecting at its forward end beyond the wall of said groove and engaging said cross-bar, said hook covering the forward end of said plate and forming with said plate a complete housing for said cross-bar.

Figure 1:
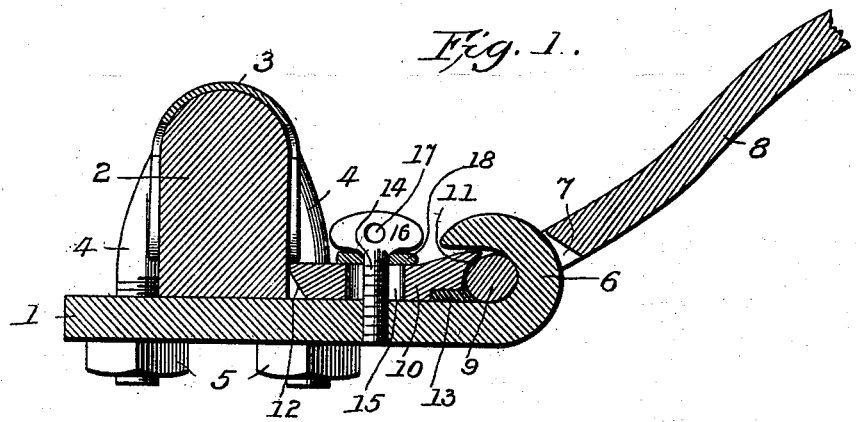
Figure 2:
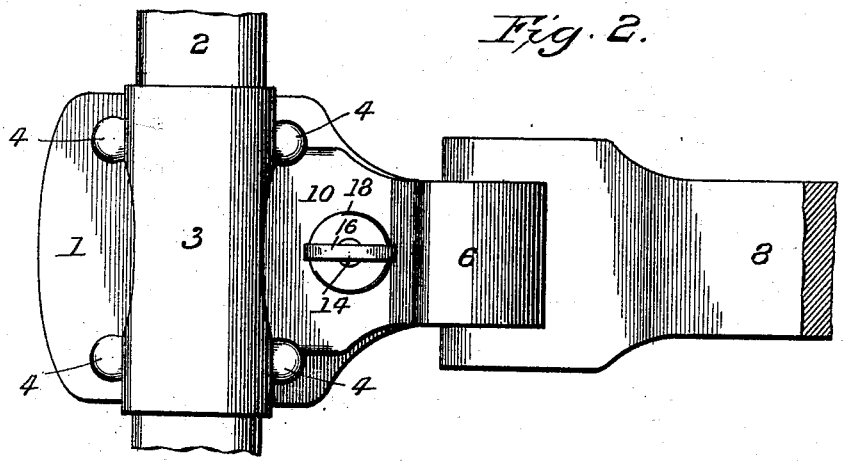
Figure 3:
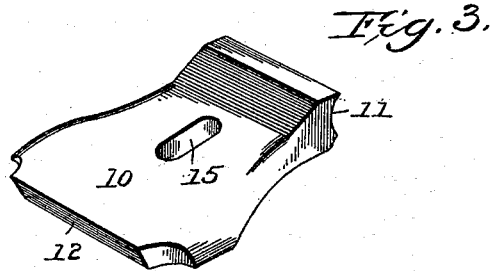

In the drawings forming part of this specification, Figure 1 is a longitudinal sectional view of the device. Fig. 2 is a plan view of the same. Fig. 3 is a detail perspective view of the locking-plate.

Like reference-numerals indicate like parts in the several views.

The base-plate 1 is secured to the axle 2 of the vehicle by means of a clip 3, the said clip embracing said axle and being provided with four threaded prongs or arms 4 4, which extend through openings in the base-plate and receive the securing-nuts 5. By providing four arms on the clip 3 instead of two, as on the ordinary clip, I secure greater bearing-surface between the axle and the base-plate, and consequently produce a steadier and more reliable connection between these parts. In advance of the axle 2 the base-plate 1 is narrower than it is just beneath said axle, and its extreme forward end is bent upwardly and rearwardly, forming a loop or hook 6. The said hook extends through a slot 7 in the rear end of the shaft-iron 8, and the cross-bar 9 formed by said slot is engaged by said hook to connect the shafts to the vehicle. The coupling is completed by the locking-plate 10, which rests upon the upper side of the base-plate 1 and is provided with a transverse groove 11 in its forward end, which receives the cross-bar 9. When in place, the rear end of the locking-plate bears against the axle 2, which prevents rearward movement of said plate, and the forward end thereof lies beneath the bill of the hook 6. The said rear end of the locking-plate is beveled, as shown at 12, to enable it to be seated, as described. The under side of said plate is recessed, as shown, and in the recess is cemented or otherwise secured a block 13, of rubber or other suitable material, which projects beyond the front edge of said plate, bears against the cross-bar 9, and serves to prevent rattling of the parts.

The locking-plate 10 is retained in place and adapted to be adjusted by a screw or bolt 14, which extends through an elongated slot 15 in said plate and engages a threaded aperture in the base-plate 1. The said screw has a flat head 16, provided with a lateral opening 17 for the reception of a wire or rod, by means of which said screw may be turned for the purpose of loosening or tightening it. Beneath the head 16 is a washer 18.

Constructed as above described it will be seen that I have devised a shaft-coupling of few parts which may be readily assembled or disconnected and one which is extremely effective in its operation. Accidental disconnection of the shaft from the vehicle is an impossibility except by breakage, and the parts are so arranged that no strain is brought upon coupling bolts or pins, the breakage of which is so common in the ordinary form of coupling. Rattling is also effectually avoided, and adjustment to compensate for wear is provided for. This adjustment is accomplished, as will perhaps be already obvious, by simply loosening the screw 14, moving the locking-plate 10 toward the cross-bar 9, and retightening the screw. Of course if the parts become very loose a strip of sheet metal may be placed between the rear edge of the locking-plate and the axle 2.

Having now described my invention, what I claim as new, and desire to secure by Letters Patent, is—

In a shaft-coupling, the combination with the vehicle-axle, of a base-plate on the under side thereof, a clip, independent of said plate, for securing the latter to the axle, an upwardly-extending hook upon the forward end of said base-plate, a shaft-iron having a slot in its rear end which encircles said hook and forms a cross-bar which engages said hook, a locking-plate for retaining said cross-bar and hook in coupling relation having a grooved forward end which engages said cross-bar and a longitudinally-extending recess on its under side which intersects said grooved forward end, and a block of rubber or other analogous material secured in said recess projecting at its forward end beyond the wall of said groove and engaging said cross-bar, said hook covering the forward end of said plate, and forming with said plate a complete housing for said cross-bar, as and for the purpose set forth.

In testimony whereof I have hereunto set my hand in presence of two subscribing witnesses.

EMORY F. HOLMES.

Witnesses:
JOHN W. MCKEE,
C. G. DUY.